US006705629B2

(12) United States Patent
Post et al.

(10) Patent No.: US 6,705,629 B2
(45) Date of Patent: Mar. 16, 2004

(54) WHEEL CHAIR

(75) Inventors: Willem Michael Post, Best (NL); Rob Verhulsdonk, Eindhoven (NL)

(73) Assignee: Mediquip Holland B.V., Helmond (NL)

( * ) Notice: Subject to any disclaimer, the term of this patent is extended or adjusted under 35 U.S.C. 154(b) by 0 days.

(21) Appl. No.: 10/040,511

(22) Filed: Jan. 8, 2002

(65) Prior Publication Data

US 2002/0180176 A1 Dec. 5, 2002

Related U.S. Application Data

(63) Continuation of application No. PCT/NL00/00485, filed on Jul. 10, 2000.

(30) Foreign Application Priority Data

Jul. 9, 1999 (NL) ............................................ 1012548

(51) Int. Cl.[7] ................................................ B62M 1/14
(52) U.S. Cl. .................................. 280/250.1; 250/304.1
(58) Field of Search ........................... 280/250.1, 304.1, 280/650; 180/907

(56) References Cited

U.S. PATENT DOCUMENTS

| | | | | | |
|---|---|---|---|---|---|
| 4,813,693 | A | | 3/1989 | Lockard et al. | 280/42 |
| 4,893,827 | A | | 1/1990 | Gay et al. | 280/250.1 |
| 5,297,021 | A | * | 3/1994 | Koerlin et al. | 700/56 |
| 5,480,172 | A | | 1/1996 | James | 280/250.1 |
| 5,480,179 | A | * | 1/1996 | Peacock | 280/650 |
| 6,126,186 | A | * | 10/2000 | Mascari | 280/220 |
| 6,257,609 | B1 | * | 7/2001 | O'Neill, Sr. | 280/304.1 |
| 6,276,704 | B1 | * | 8/2001 | Suiter | 280/250.1 |
| 6,296,265 | B1 | * | 10/2001 | Lovins | 280/250.1 |
| 6,311,999 | B1 | * | 11/2001 | Kueschall | 280/250.1 |
| 6,428,029 | B1 | * | 8/2002 | Barclay | 280/250.1 |

FOREIGN PATENT DOCUMENTS

| | | |
|---|---|---|
| DE | 29718534 | 2/1998 |
| EP | 0329002 | 8/1989 |
| NL | 8701561 | 2/1989 |
| NL | 1001164 | 3/1997 |

* cited by examiner

*Primary Examiner*—Avraham Lerner
*Assistant Examiner*—L. Lum
(74) *Attorney, Agent, or Firm*—Jones Day

(57) ABSTRACT

A wheel chair having two rear wheels, two front wheels, a supporting frame, a seal and a backrest, where the seat can be moved from a sitting position to a driving position, and vice versa, and wherein the center of gravity of a user's body is moved rearwardly and downwardly when adjusting from the sitting position to the driving position.

6 Claims, 3 Drawing Sheets

WHEEL CHAIR

PRIORITY CLAIM

This application is a continuation of International Application Number PCT/NL00/00485, filed Jul. 10, 2000, which claims the benefit of Netherlands's Patent Application No. 1012548, filed Jul. 9, 1999.

BACKGROUND OF THE INVENTION

1. Field of the Invention

The invention relates to a wheel chair comprising at least two rear wheels, at least one front wheel, a supporting frame, a seat assembly, simply called "seat" hereinafter and in the claims, and a backrest assembly, simply called "backrest" hereinafter and in the claims.

2. Description of the Related Art

A wheel chair of this kind is known from Dutch patent No. 1001164 (Revab BV). The supporting frame of the prior art wheel chair consists of tubular sections, whilst the seat is built up of a seat cushion which is positioned on a seat edge, a flap and a supporting strap. When the supporting strap is fully tightened, the flap is positioned approximately level with the seat edge, and in effect a user does not experience a seat angle. When the supporting strap is adjusted less tight, the seat cushion sinks slightly along with the flap, as a result of which a relatively larger angle of inclination of the seat is obtained. The prior art backrest consists of a backrest cushion, deformation of which can be adjusted individually for each user through adjustment of the straps present therebehind.

One objection of the wheel chair as known from the aforesaid Dutch patent publication is that it does offer an disabled person a possibility to slightly adjust the seat, as regards the angle of inclination thereof, to his or her individual requirements, to be sure, but that it has become apparent in practice that this enables an acceptable seating position only in passive condition, that is, at rest, when the user is for example eating, writing or reading. In active condition, when the user is driving, the prior art wheel chair does not enable an acceptable seating position from an ergonomic point of view.

BRIEF SUMMARY OF THE INVENTION

The object of the invention is to provide a wheel chair which creates an optimum seating position for a user, both at rest and while driving.

In order to accomplish that objective, a wheel chair of the kind referred to in the introduction is characterized in that the seat can be moved from a sitting position to a driving position, and vice versa, wherein the center of gravity of a user's body is moved parallel to the direction of movement of the wheel chair.

The invention will now be explained in more detail with reference to illustrations of a preferred variant of the invention which are shown in a drawings, wherein:

DETAILED DESCRIPTION OF PREFERRED EMBODIMENTS OF THE INVENTION

Figure 2:
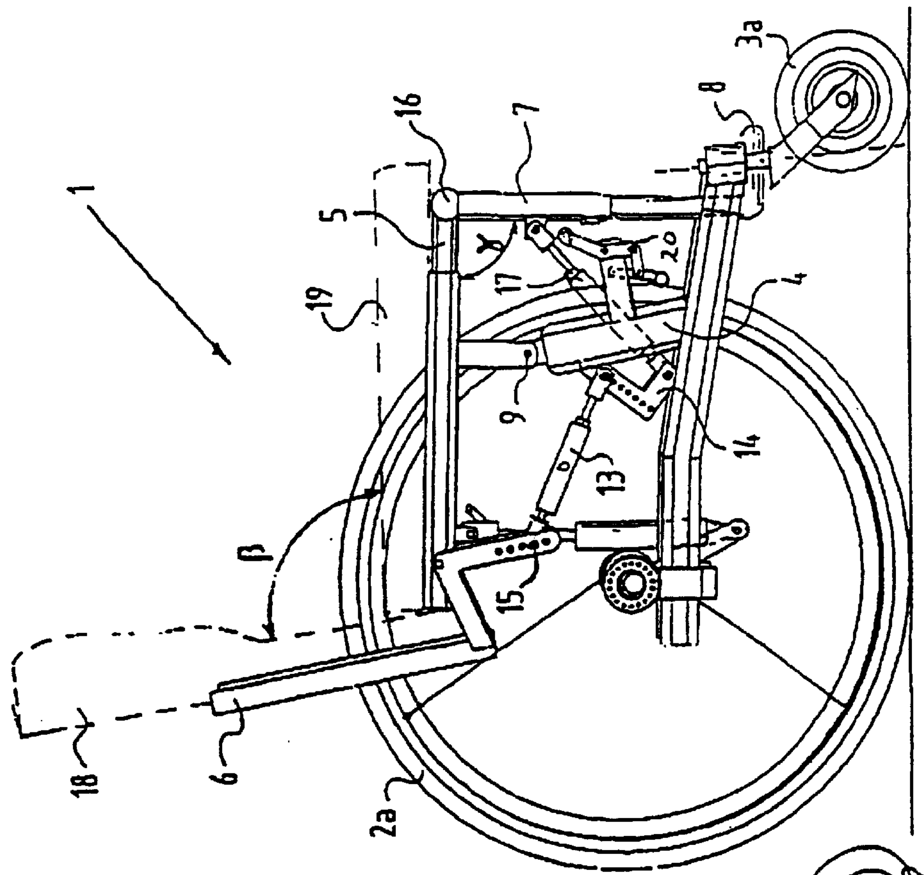
FIGS. 2 and 3 are schematic side views of the wheel chair of FIG. 1, showing the sitting position and the driving position, respectively.

The wheel chair disclosed here is characterized in that the seat can be moved wherein the center of gravity of a user's body is also moved. In particular it is possible for a user to move the seat himself with the aid of spring means, for example a gas spring, between the sitting position and the driving position while sitting. The invention is in particular based on the insight that the location of the body's center of gravity while sitting and driving is a decisive factor in the realisation of the ideal seating position of a wheel chair user. According to the invention, in active condition this center of gravity of the body must be located downwardly and rearwardly, seen in the direction of movement, of the position of the center of gravity of the body in passive condition. According to the invention, when the seat is being moved the body's center of gravity is moved so that an optimum seating position of the disabled user is ensured at all times both in the active condition, that is, in the driving position of the seat, and in the passive condition, that is, the sitting position of the seat.

In one preferred embodiment of a wheel chair according to the invention, the seat is tilted relative to a pivoting point located some distance under the seat upon being adjusted, in such a manner that the center of gravity of a user's body is moved to rearwards in a direction towards the rear wheels upon adjustment to the driving position, and that the center of gravity of a user's body is moved forwards in a direction away from the rear wheels upon adjustment to the sitting position. The aforesaid distance is measured from the underside of the seat and it ranges in particular between approximately 4 and 12 cm. Preferably, said distance is approximately 8 cm. As a result, the wheel chair will exhibit better driving characteristics, that is, it will drive more lightly, be easier to manoeuver, etc. When the seat is tilted back, the body's center of gravity is moved to the front again, so that a stable sitting, working and/or eating position is realized. The user can move his body more easily in that case, whilst the risk of tilting backward is minimized.

In another preferred embodiment of a wheel chair according to the invention the angle included between the seat and the backrest is made smaller upon adjustment to the driving position, and it is made larger upon adjustment to the sitting position. In particular the backrest is moved rearwards in a direction towards the rear wheels upon adjustment to the driving position, and it is moved forwards in a direction away from the rear wheels upon adjustment to the sitting position. Accordingly, the backrest is likewise movable from a sitting position to a driving position, and vice versa. Preferably, the present wheel chair comprises a leg support, wherein the acute angle included between the seat and the leg support is made smaller upon adjustment to the driving position and larger upon adjustment to the sitting position.

In another preferred embodiment of a wheel chair according to the invention the leg support is moved upwards in a direction towards the rear wheels upon adjustment to the driving position, and downwards in a direction away from the rear wheels upon adjustment to the sitting position. Accordingly, the leg support is also movable from a sitting position to a driving position, and vice versa. As a result, additional clearance is available between a footrest which is present at the bottom of the leg support and the ground while driving, which adds to the manoeuvrability of the wheel chair, in particular when negotiating curbs and the like. The aforesaid clearance is minimal in the sitting position of the leg support, so that an ideal and stable sitting, working and/or eating position is obtained, whilst the present wheel chair can readily be driven under a tabletop.

More in particular, the leg support is thereby positioned between the two front wheels.

In another preferred embodiment of a wheel chair according to the invention, the angle included between the seat and the backrest in the sitting position is adjustable. Moreover, it is to be preferred to make the angle which the backrest includes between the sitting position and the driving position adjustable. All this takes place as follows. The backrest is connected to the supporting frame by means of the seat and by means of an arm which is adjustable for length, which arm is pivotally connected to a point of attachment on the supporting frame and to a point of attachment on the backrest, wherein several points of attachment for the arm are provided in, respectively, the supporting frame or the backrest, which points of attachment substantially lie on a circular arc, which circular arc has as its center the point of attachment on, respectively, the backrest or the supporting frame in the sitting position or in the driving position. All this implies that the angle included between the seat and the backrest in the sitting position can be adjusted individually for each user, independently of the "stroke" which the backrest makes upon being adjusted, which is likewise individually adjustable as desired. The point of attachment of the arm on the backrest preferably coincides with a user's sitting bumps.

Important is that the lumbar-pelvic rhythm is followed upon adjustment of at least substantially all parts of the wheel chair. The term lumbar-pelvic rhythm is understood to mean the motion rhythm of a wheel chair user, in particular as regards the low back and pelvis regions, upon changes in the seating position.

In another preferred embodiment of a wheel chair according to the invention the backrest comprises a hard material in the user's pelvis region, which functions to support the pelvis, whilst the backrest comprises a soft material at the location of the central and/or upper part of a user's back, which functions to support the central and/or upper back regions. In particular, the pelvis is supported on a hard foam material. The backrest is made of a soft foam material near the lumbar and low thorax regions, so that said material does support the back but does not need to absorb any large forces whilst nevertheless being capable of meeting the aforesaid lumbar-pelvic rhythm requirement. In one preferred variant, recesses are formed in the backrest to enable a user to freely move his arms/elbows in rearward direction.

In another preferred embodiment of a wheel chair according to the invention, the wheel chair is collapsible, which makes the whole easily transportable. In one preferred variant the pivot axis of a front wheel slopes upwards towards the rear with respect to the vertical, seen in the forward direction of movement of the wheel chair, in particular at an angle of about 1.5' with respect to the vertical, in order to prevent the so-called "shimmying" effect, that is, the phenomenon whereby the front wheels in the form of castor wheels position themselves transversely to the direction of movement, frequently at high speeds, in the case of low perpendicular loads. In practice it has become apparent that the aforesaid effect is efficiently suppressed due to the fact that one component of the force of gravity urges the castor wheels back to the correct position every time this phenomenon occurs.

Figure 1:
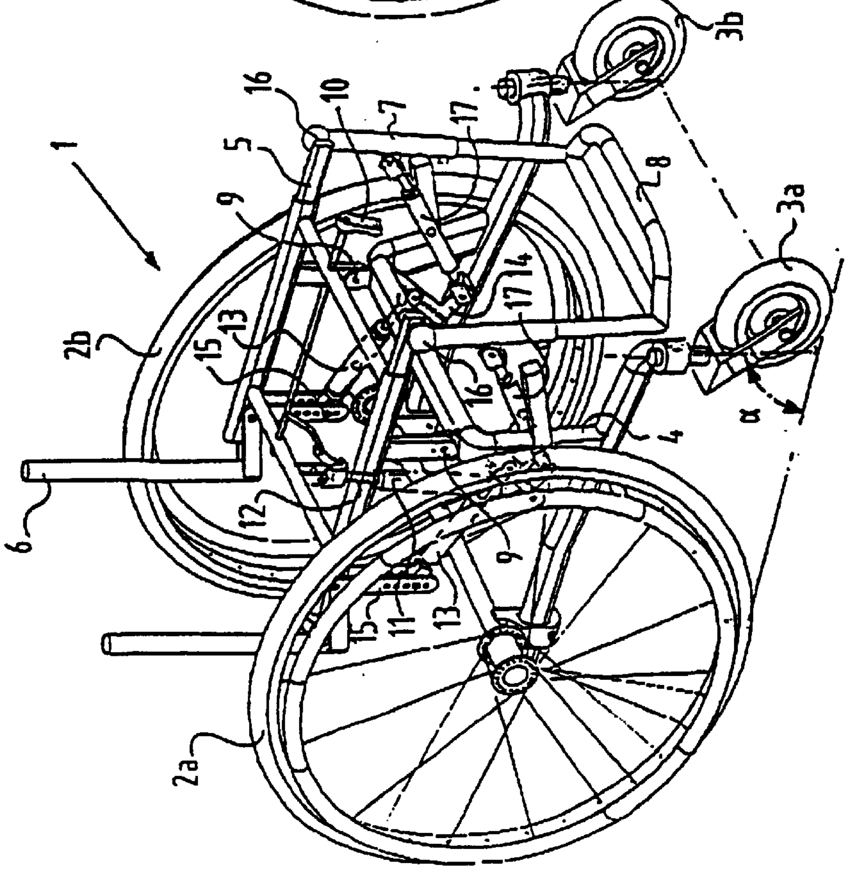
FIG. 1 is a schematic, perspective view of a wheel chair according to the invention.

FIG. 1 shows a wheel chair 1 according to the invention, which comprises two spoked rear wheels 2*a*, 2*b*, which are interconnected by means of a rigid rear axle, two smaller castor wheels 3*a*, 3*b*, which function as front wheels, a supporting frame 4, as well as a seat assembly 5 and a backrest assembly 6. For easy reference, lest the figure becomes too complicated, the two assemblies are shown without a seat cushion and a backrest cushion, respectively. A leg support 7 is furthermore provided, on the lower end of which a footrest 8 is mounted.

The seat assembly 5, hereinafter also called "seat", is capable of tilting movement with respect to supporting frame 4, about a pivoting point 9 that is located some 8 cm below the seat, and that from a sitting position, as shown in FIG. 1, to a driving position yet to be explained in more detail with respect to FIG. 3, and vice versa. The center of gravity of a user's body is moved to the rear, seen in the direction of movement of the wheel chair 1, in a direction towards the rear wheels 2*a*, 2*b* upon adjustment to the driving position. Whilst subsequently, upon adjustment to the sitting position which is shown in the present figure, said center of gravity is moved to the front, in a direction away from the rear wheels 2*a*, 2*b*. Adjustment of the seat to the above positions can be effected by hand by the user himself from a seated position with the aid of a gas spring 11, which can be activated by means of an actuating element 10. The gas spring 11 is connected to supporting frame 4 at its lower end and to seat 5 at its upper end, in such a manner that seat 5 is tilted to the sitting position in the extended position of a piston rod 12 of gas spring 11 and that seat 5 is pivoted to the driving position in the retracted position of piston rod 12.

The backrest assembly 6, hereinafter also referred to as "backrest", can likewise be tilted from a sitting position to a driving position, and vice versa. Of major importance is thereby the fact that the tilting angle, that is, the angle through which the backrest moves between the sitting position and the driving position, as well as the angle included between seat 5 and backrest 6, is individually adjustable for each user. This is done in the following manner. First, the angle included between seat 5 and backrest 6 in the sitting position is adjusted through adjustment of the length of 3S the adjustable pull rod in that position, which is done through adjustment of the pull rod 13, which is in the form of a threaded rod. Then seat 5 and backrest 6 are tilted to the driving position. In that position the point of attachment of pull rod 13 to supporting frame is adjusted by selecting as the point of attachment one of the points of attachment 14 that all lie on a circular arc, which has the point of attachment 15 of pull rod 13 to backrest 6 as its center. This makes it possible to adjust the angle included between seat 5 and backrest 6 in the sitting position and the aforesaid tilting angle in an optimum manner, independently of each other, according to the user's individual requirements.

Also leg support 7 can be moved from a sitting position to a driving position, and vice versa, by the user. Leg support 7 pivots upwards about its point of attachment 16 to seat 4, in a direction away from castor wheels 3*a*, 3*b*, upon adjustment from the sitting position as shown in FIG. 1 to the driving position as will be explained in more detail yet with respect to FIG. 2. Leg support 7 can pivot back from the thus obtained position to the sitting position by moving forwards towards castor wheels 3*a*, 3*b*. Leg support 7 and footrest 8 are positioned between castor wheels 3*a*, 3*b*, so that the wheel chair can readily be driven under a table, desk or the like to an ideal eating or working position for the user. Leg support 7 is connected to supporting frame 4 by means of a rod 17. Since the leg support 7 is moved upwards upon adjustment to the driving position, the wheel chair is prevented from striking against obstacles lying in the path of the wheel chair, such as curbs and the like, too easily.

As FIG. 1 shows, the pivot axis of castor wheels 3*a*, 3*b* slopes upwards to the rear with respect to the vertical in order to prevent the aforesaid shimmying effect. The acute angle thus included in particular ranges between 0.5–10, preferably it is about 1.5'. The angle alpha which is shown in FIG. 1 will be about 88.50 in that case.

Figure 3:
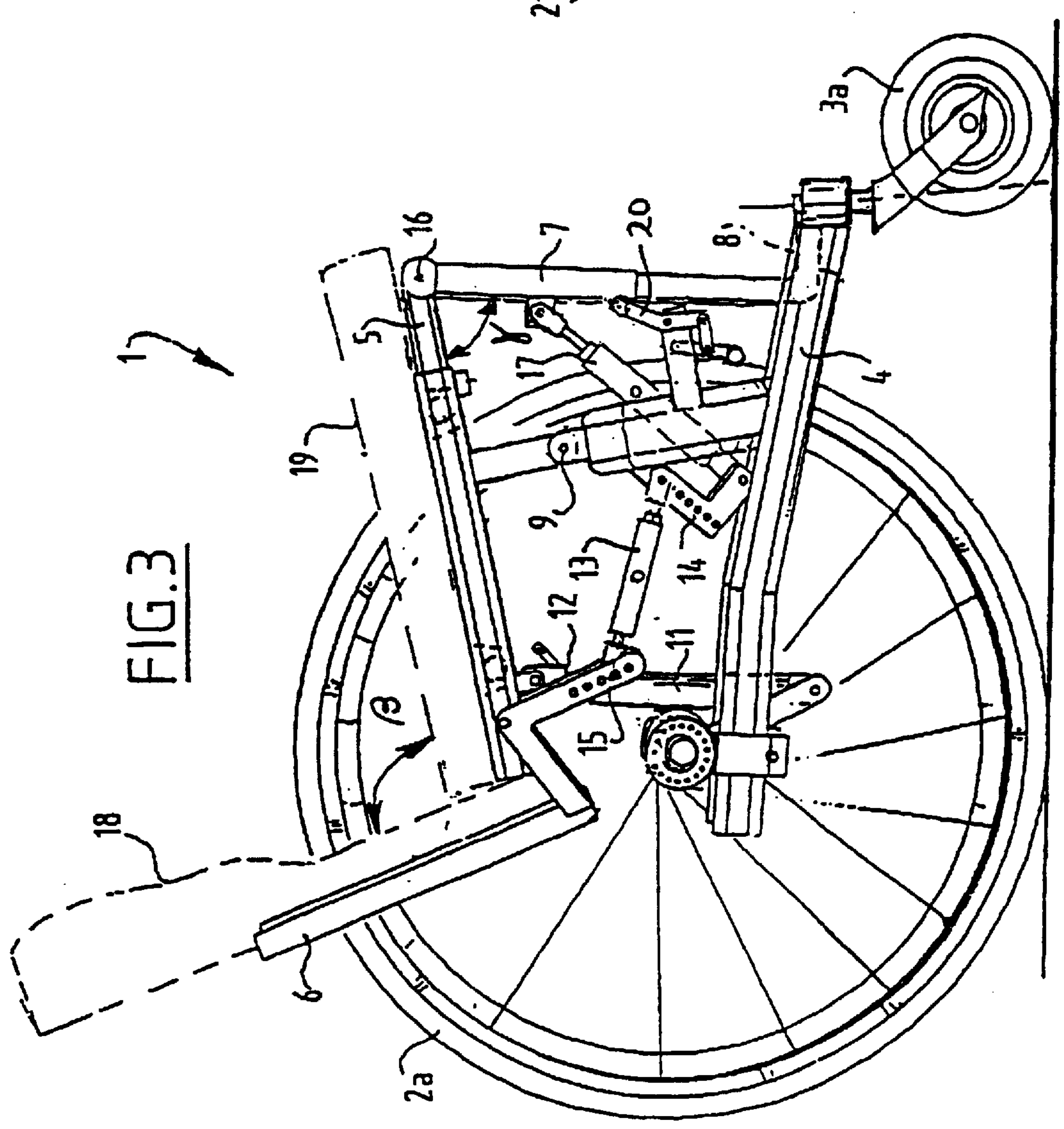

FIGS. 2 and 3 are side views of the wheel chair 1 of FIG. 1, showing the seat 5, the backrest 6 and the leg support 7 in the sitting position (FIG. 2) and in the driving position (FIG. 3), wherein parts that correspond to parts which are shown in FIG. 1 are indicated by the same numerals as in FIG. 1. The backrest cushion and the seat cushion are indicated at 18 and 19, respectively, whilst FIG. 3 furthermore shows a brake mechanism 20. Upon adjustment from the sitting position (FIG. 2) to the driving position (FIG. 3), the angle beta included between seat 5 and backrest 6 is made smaller, and the angle gamma included between seat 5 and leg support 7 is likewise made smaller. Upon adjustment back to the sitting position, said angles beta and gamma are made larger. Leg support 7 is positioned between front wheels 3*a*, 3*b*, whereby leg support 7 can be moved upwards in a direction towards rear wheels 2*a*, 2*b* upon adjustment to the driving position, whilst it can be moved downwards in a direction away from the rear wheels 2*a*, 2*b* upon adjustment to the sitting position.

Figure 4:
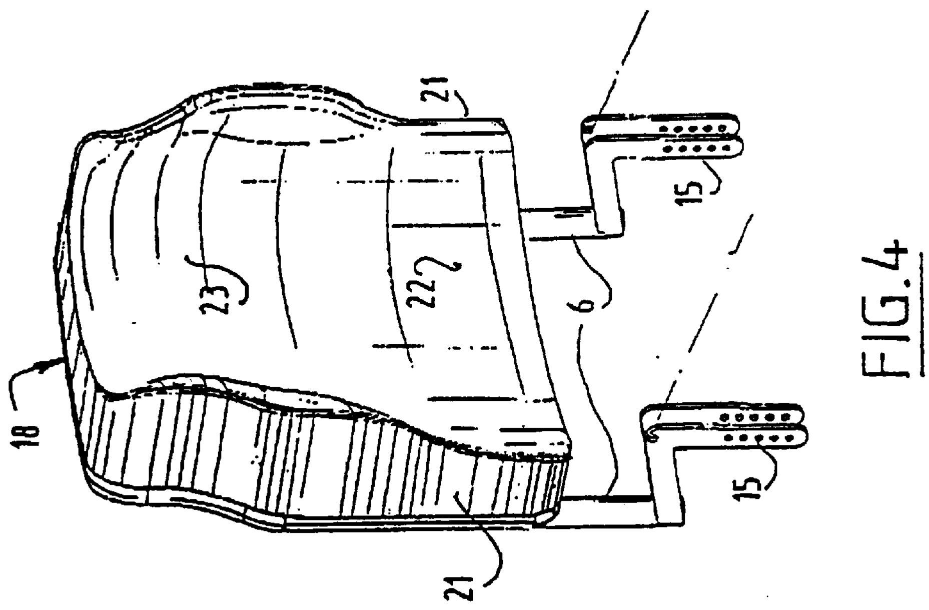
FIG. 4 is a detailed view of the backrest cushion of the wheel chair of FIGS. 1, 2 and 3.

FIG. 4 is a schematic, perspective view of the backrest cushion 18, in which recesses have been formed on either side, seen in the direction of movement, so as to enable a user to freely move his arms/elbows in rearward direction. Cushion 18 comprises a hard foam material 22 in the lumbar and low thorax regions to support a user's pelvis, as well as a soft foam material 23 to support said user's central and upper back regions.

Figure 5:
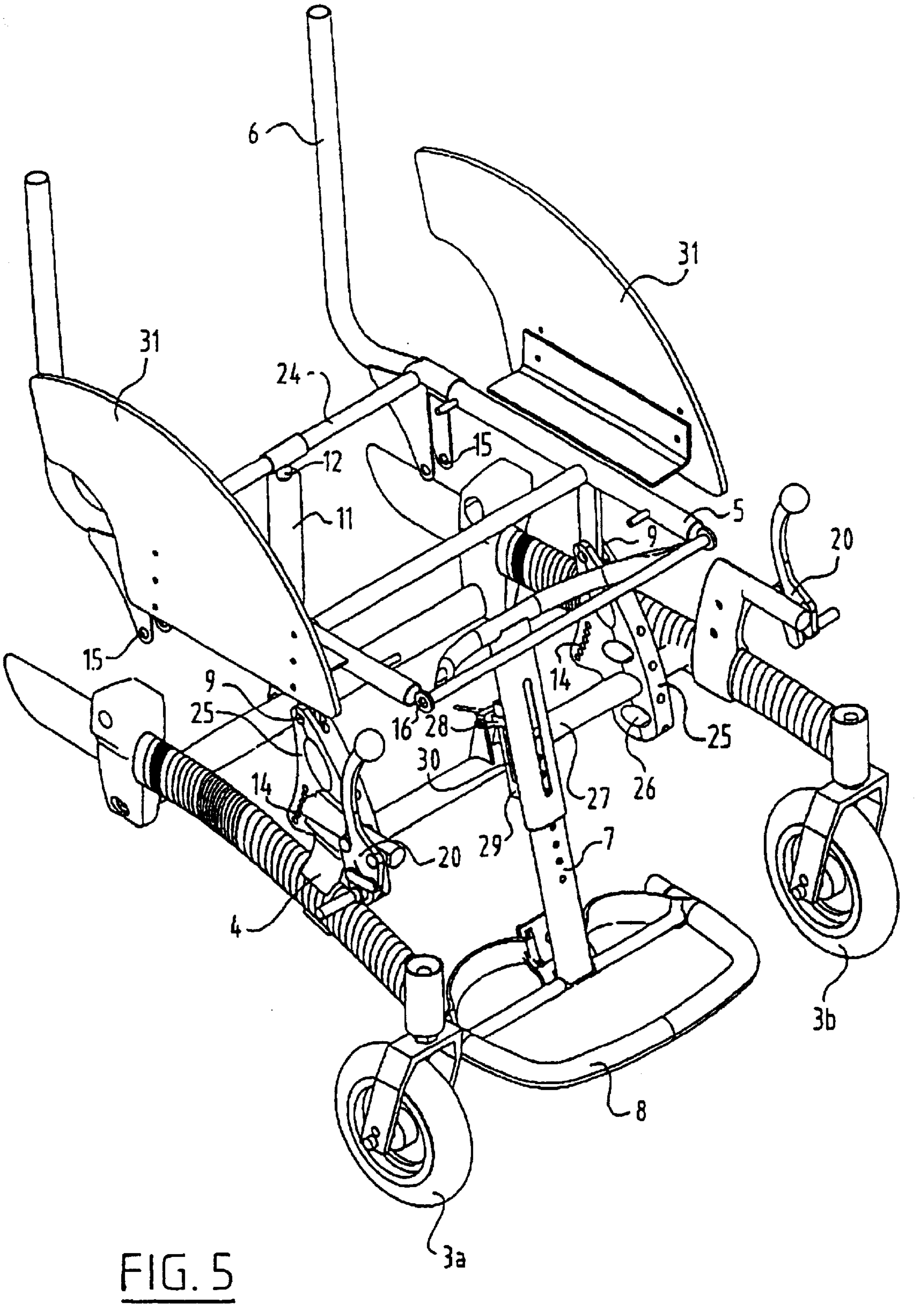
FIG. 5 is a schematic, perspective view of a variant of a wheel chair according to the invention.

FIG. 5 shows a variant of the wheel chair, wherein parts that correspond to parts which are shown in FIGS. 1, 2 and 3 are indicated by the same numerals as in said figures. In this variant the backrest 6 can be swung down, so that the wheel chair can be transported in a compact form. Backrest 6 is pivotable about pin 24 for that purpose, and it can be pivoted in the direction of seat 5.

Furthermore the height of the assembly consisting of seat 5, backrest 6 and leg support 7 is adjustable as a whole by means of connecting members 25, which are provided with several unround holes 26. The connecting members 25 consist of two parts which can be screwed together, wherein supporting rod 27 of supporting frame 4 can be enclosed in one of the holes 26 for the purpose of adjusting the desired height. Since holes 26 are not round, rotation of the connecting members 25 is not possible.

Another special feature of this variant is the fact that the leg support 7 is not connected to supporting frame 4 by means of a rod 17, as in the preceding figures, but by means of a pin 28 mounted on supporting rod 27, which pin is capable of sliding movement, substantially in one direction, in a block 29 which is mounted on leg support 7, and which is to that end provided with a slot 30. Furthermore this variant shows two wheel guards 31, which protect the user from coming into contact with the rotating rear wheels 2*a*, 2*b*.

What is claimed is:

1. A wheel chair (1) comprising at least two rear wheels (2*a*, 2*b*), at least two front wheels (3*a*, 3*b*), a supporting frame (4), a seat assembly (5) and a backrest assembly (6), wherein the seat (5) can be moved from a passive sitting position to an active driving position, and vice versa, wherein the seat (5) is tilted relative to a pivoting point (9) located some distance under the seat (5) upon being adjusted, in such a manner that the center of gravity of a user's body is moved rearwardly in a direction toward the rear wheels (2*a*, 2*b*) upon adjustment to the driving position, and that the center of gravity of a user's body is moved forwardly in a direction away from the rear wheels (2*a*, 2*b*) upon adjustment to the sitting position, and wherein an angle β included between the seat (5) and the backrest (6) is made smaller upon adjustment to the driving position, and it is made larger upon adjustment to the sitting position, characterized in that the wheel chair (1) comprises a leg support (7), wherein an angle γ included between the seat (5) and the leg support (7) is made smaller upon adjustment to the driving position and larger upon adjustment to the sitting position, and wherein the leg support (7) is moved upwards in a direction towards the rear wheels (2*a*, 2*b*) upon adjustment to the driving position, and downwards in a direction away from the rear wheels (2*a*, 2*b*) upon adjustment to the sitting position, said leg support (7) being positioned between the two front wheels (3*a*, 3*b*).

2. The wheel chair (1) according to claim 1, wherein the angle β included between the seat (5) and the backrest (6) in the sitting position is adjustable.

3. The wheel chair (1) according to claim 2, wherein the angle β included between the seat (5) and the backrest (6) in the driving position is adjustable.

4. The wheel chair (1) according to claim 1, wherein said wheel chair (1) is collapsible.

5. The wheel chair (1) according to claim 2, wherein the backrest (6) is connected to the supporting frame (4) by means of the seat (5) and by means of an arm (13) which is adjustable for length, which arm (13) is pivotally connected to a point of attachment (14) on the supporting frame (4) and to a point of attachment (15) on the backrest (6), wherein several points of attachment for the arm (13) are provided in, respectively, the supporting frame (4) or the backrest (6), which points of attachment (14, 15) substantially lie on a circular arc, which circular arc has as its center the point of attachment (15, 14) on, respectively, the backrest (6) or the supporting frame (4) in the sitting position or in the driving position.

6. The wheel chair (1) according to claim 5, wherein the points of attachment (14, 15) that lie on said circular arc are spaced 5–18 degrees, preferably 7–15 degrees, apart on said circular arc.

* * * * *